(12) United States Patent
Yamasaki

(10) Patent No.: US 7,823,817 B1
(45) Date of Patent: Nov. 2, 2010

(54) DESKTOP ELECTRIC STIRRER

(76) Inventor: Masashi Yamasaki, 3-3-106, Sakuragaokahigashi, Akaiwa-shi, Okayama 709-0721 (JP)

( * ) Notice: Subject to any disclaimer, the term of this patent is extended or adjusted under 35 U.S.C. 154(b) by 0 days.

(21) Appl. No.: 12/809,204

(22) PCT Filed: Nov. 28, 2008

(86) PCT No.: PCT/JP2008/071723

§ 371 (c)(1), (2), (4) Date: Jun. 18, 2010

(87) PCT Pub. No.: WO2010/061481

PCT Pub. Date: Jun. 3, 2010

(51) Int. Cl.
*B02C 19/00* (2006.01)

(52) U.S. Cl. .............................. 241/46.017; 241/46.17; 366/279

(58) Field of Classification Search ............ 241/46.017, 241/46.08, 46.11, 46.17, 172; 366/315, 316, 366/317, 279, 281, 282, 283

See application file for complete search history.

(56) References Cited

U.S. PATENT DOCUMENTS 5,863,118 A    1/1999   Ackels et al.

FOREIGN PATENT DOCUMENTS

| JP | 4943591 | 4/1974 |
|---|---|---|
| JP | 5114272 | 2/1976 |
| JP | 52115695 | 9/1977 |
| JP | 5493094 | 7/1979 |
| JP | 5570041 | 5/1980 |
| JP | 2000184971 | 7/2000 |
| JP | 2001511382 | 8/2001 |
| JP | 3803357 | 8/2006 |

OTHER PUBLICATIONS

PCT/JP2008/071723; International Search Report dated Jan. 6, 2009.

*Primary Examiner*—Mark Rosenbaum
(74) *Attorney, Agent, or Firm*—Renner, Otto, Boisselle & Sklar

(57) ABSTRACT

A tabletop electric stirrer includes a rotating body and an electric rotating drive. This stirrer can perform stirring efficiently, can easily crush and dissolve a water soluble capsule not only in hot water but also in cold water, and can crush a plurality of capsules in a short period of time.

2 Claims, 9 Drawing Sheets

(a)  (b)

(a)  (b)  (c)

(a)    (b)

(a)    (b)

DESKTOP ELECTRIC STIRRER

TECHNICAL FIELD

The present invention relates to a tabletop electric stirrer. More specifically, the present invention relates to a tabletop electric stirrer that can crush, for example, powdered green tea, matcha (a form of powdered green tea), or cocoa or a water-soluble capsule filled with such materials in a short period of time by stirring and dissolve them not only in hot water but also in cold water and, furthermore, that has a foaming function.

BACKGROUND ART

In recent years, it has been proved that tea is effective in maintaining health, and attention has been paid to the medicinal properties of tea. In particular, tea contains, for example, catechins having an oncogenic suppression activity and an antibacterial activity, carotene having an oncogenic suppression activity, and vitamin E having an antioxidant activity and a senescence suppression activity.

However, with sencha, medium-grade green tea made by decocting tea leaves in a teapot, vitamin E, carotene, dietary fiber and other components of the tea leaves do not dissolve into hot water. Furthermore, with respect to catechins, only about 23% of the entire amount of catechins contained in the tea leaves dissolves, and most of these components remain undissolved in used tea leaves, which are discarded.

On the other hand, matcha made by processing tea leaves into fine powder is a form of drink that allows for intake of 100% of the components of the tea leaves. However, matcha is in most cases drunk in the field of tea ceremony and is not commonly drunk. The tea ceremony is also a kind of art that values the rules of behavior and requires appropriate tea equipment accordingly. Therefore, matcha cannot be drunk as conveniently as medium-grade green tea.

Thus, in recent years, matcha filled in capsules is sold as supplements (dietary supplements). Patent Document 1 discloses a device (tabletop stirrer) for dissolving a water-soluble capsule so that matcha filled in the water-soluble capsule can be drunk conveniently.

However, the tabletop stirrer of Patent Document 1 aims at crushing and dissolving a capsule manually using hot water. Therefore, for example, it takes much time to crush and dissolve a capsule using cold water during the hot summer season. Furthermore, to make tea for several people at one time, it is necessary to crush and dissolve a plurality of capsules at one time, and hence there is a problem in that a considerably long time is required when a manual stirrer is used. Moreover, even when the tabletop stirrer of Patent Document 1 is applied to an electrically driven type as it is, in the case of an electrically-driven stirrer rotating at a constant speed, its structure causes a phenomenon in which the capsule is caught in the space between the stirring blades. Therefore, the capsule cannot be crushed and dissolved.

Moreover, electric stirring and foaming tools for coffee are commercially available. Such a tool has a stirring portion formed of a coil that is processed into a doughnut shape. When such a tool is used to perform stirring and foaming, if the tool is inserted upright into a vessel from above and rotated, a vortex having a hollow central portion is generated, which makes it difficult to form foam effectively. Therefore, in order to form foam effectively, a tricky operation of, for example, tilting the tool to various angles or moving the tool in all directions is necessary. There also is a problem in that an incorrect operation results in the splashing of droplets to the outside of the vessel.

Generally, if a rotating body is rapidly rotated underwater at a constant speed, a V-shaped vortex is formed by centrifugal forces, and a cavity is generated around the rotating shaft. It is inefficient to provide the rotating shaft with a structure that can act on flotages in water. The water flow forming a vortex is a horizontally rotating water flow except for the time when the vortex is initially formed. Therefore, energy that moves the flotages vertically is not generated. Thus, the occurrence of a V-shaped vortex due to high-speed rotation is a disadvantageous phenomenon in crushing and dissolving the flotages and forming foam by stirring.

Even if a rotating body that is capable of pumping without generating a V-shaped vortex could be realized, the flotages could possibly not be carried by the flow of pumped water depending on the tip shape of the rotating body. That is to say, if the tip of the rotating body has a horizontal plane or if a horizontal plane is formed at a tip portion of the rotating body as a result of rotation, when the rotating body is rotated, the flotages are adsorbed to a bottom surface of the rotating body, rotate in horizontal direction together with the rotating body, and do not move upward.

For example, some types of submersible pumps are capable of pumping by rotating propeller blades (submersible propeller pumps). However, even though such pumps are capable of pumping, when the propeller blades are rotated, a horizontal rotating water flow is generated in the plane of rotation. Therefore, there is the disadvantage that flotages that are elongated but has a length greater than the distance between respective blades constituting the propeller cannot be carried by the flow of pumped water.

Thus, if a stirrer that is capable of allowing flotages to be carried by a flow of pumped water without generating a V-shaped vortex even when rapidly rotating and, furthermore, that can perform stirring efficiently without causing droplets to splash onto a surrounding area is provided, water-soluble capsules can be efficiently crushed and dissolved not only in hot water but also in cold water. Since even a plurality of capsules can be crushed and dissolved in a short period of time, tea or the like can be served to a plurality of people at one time. Moreover, powdered tea leaves such as matcha can be stirred and foamed conveniently and enjoyed in all seasons of the year. Furthermore, in addition to the enjoyment of various kinds of tea, it also is possible to enjoy making dressings using oil, vinegar, mayonnaise, ketchup, and the like.

Patent Document 1: Japanese Patent No. 3803357

DISCLOSURE OF INVENTION

It is an object of the present invention to provide a high-efficiency stirrer that can perform stirring efficiently by overcoming the disadvantage resulting from high-speed rotation, that can easily crush and dissolve a water-soluble capsule not only in hot water but also in cold water, and furthermore, that can crush and dissolve even a plurality of capsules in a short period of time.

The present invention provides a tabletop electric stirrer comprising a rotating body and an electric rotating means, wherein the rotating body comprises a stirring shaft, a rotating disk, and a stirring means provided with stirring blades, the stirring means being provided at one end of the stirring shaft, the rotating disk being provided directly above the stirring blades provided to the stirring means, and the other end of the stirring shaft being configured so as to be connected to the electric rotating means, wherein the stirring means has a spherical or conical tip, the tip being located on a center line of the stirring shaft, and a maximum diameter of a cross-section of the stirring means perpendicular to the stirring shaft is greater than a diameter of the stirring shaft and smaller than a diameter of the rotating disk, wherein the stirring blades are provided in such a manner that at least two stirring blades are located along an outer circumference with the maximum diameter of the stirring means so as to face the stirring shaft, and a face of the stirring blades facing the stirring shaft is a flat surface, and wherein the stirring blades are provided in such a manner that an angle formed by the flat surface and the cross-section with the maximum diameter of the stirring means on the stirring shaft side is 95° to 135° and central portions of the flat surfaces of the respective stirring blades in a width direction are located on a circumference of a single circle around the stirring shaft serving as a center.

In one embodiment, the tabletop electric stirrer comprises further a casing, wherein the casing is a tube and is fitted to the electric rotating means so as to be able to house the rotating body, wherein at least one outlet and at least one opening are formed in a side face of the casing, wherein the outlet is formed in a position that corresponds to the rotating disk when the rotating body is housed, and wherein the opening is formed between the outlet and a portion to which the electric rotating means is fitted.

According to the present invention, the stirrer has a size and a structure that can be adapted to various types of drinking vessels, can perform stirring efficiently, can easily crush and dissolve a water-soluble capsule not only in hot water but also in cold water, and furthermore, can crush and dissolve even a plurality of capsules in a short period of time.

Furthermore, since a paste-like substance such as mayonnaise or ketchup can be dissolved in a liquid in a short period of time, an oily ingredient such as oil and an aqueous ingredient such as vinegar can be uniformly stirred together. Therefore, dressing sauces can be made conveniently.

BRIEF DESCRIPTION OF THE DRAWINGS

FIG. 8(a) is a top view, FIG. 8(b) is a side view, and FIG. 8(c) is a front view. Furthermore, FIG. 8(d) is a top view, FIG. 8(e) is a side view, and FIG. 8(f) is a front view.

FIG. 9(a) is a front view and FIG. 9(b) is a top view.

FIG. 10(a) is a transverse cross-sectional view, and FIG. 10(b) is a vertical cross-sectional view.

FIG. 11(a) is a transverse cross-sectional view, and FIG. 11(b) is a vertical cross-sectional view.

FIG. 12(a) is a front view when a splash prevention cover is not fitted, FIG. 12(b) is a front view of a splash prevention cover, and FIG. 12(c) is a front view when a splash prevention cover is fitted.

LIST OF REFERENCE NUMERALS

Figure 1:
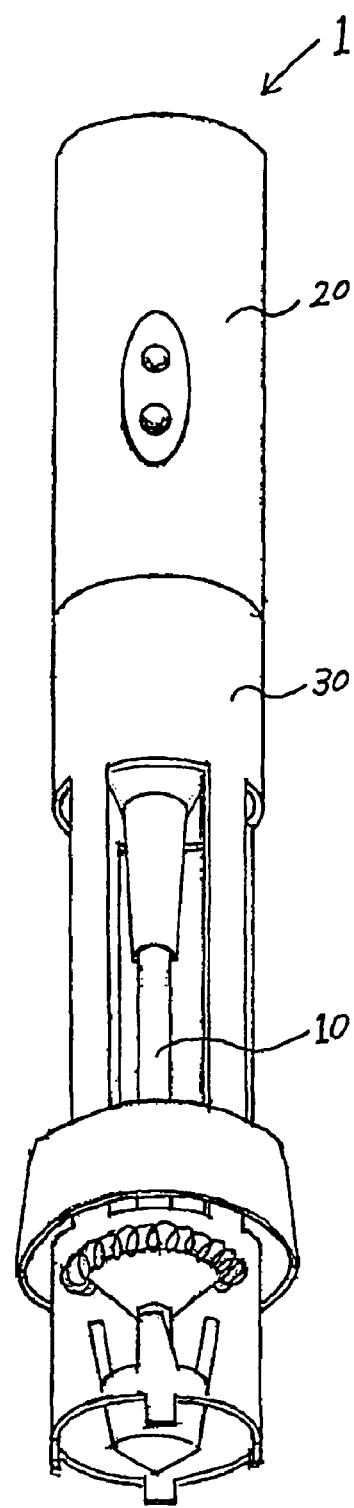
FIG. 1 is a diagram showing an embodiment of the tabletop electric stirrer of the present invention.

1 Tabletop electric stirrer
10 Rotating body
11 Stirring shaft
12 Rotating disk
121 Coil
13 Stirring means
131 Pumping aid means
14 Stirring blade
20 Electric rotating means
30 Casing
31 Outlet
32 Opening
33 Splash prevention cover
34 Liquid inlet

BEST MODE FOR CARRYING OUT THE INVENTION

In this specification, a "water-soluble capsule" refers to a water-soluble polymer capsule filled with a powdered food product so that the powdered food product can behave as a solid material. Examples of water-soluble capsules include a powdered food product coated with a water-soluble polymer, a powdered food product made in a tablet form using a water-soluble polymer as a binder, or, for example, items prepared from such a powdered food product by shaping them into a spherical shape, a flake shape, a capsule shape, or the like. It should be noted that it is preferred to minimize the amount of water-soluble polymer used for solidification. The reason for this is that water-soluble polymers may affect the taste of a food product or a beverage.

Examples of capsules include soft capsules and hard capsules. Hard capsules are preferred, and there is no particular limitation to the size of the hard capsules. Usually, in consideration of the size of various drinking vessels such as glasses, teacups, mugs, and coffee cups for use during dissolving a capsule, the minor diameter (external diameter) of a capsule is preferably not greater than 9 mm.

Examples of hard capsules include capsules derived from plant material and capsules derived from animal material, and capsules derived from plant material are preferred. Examples of the plant material include corn starch, especially a water-soluble polysaccharide (pullulan) obtained from corn starch fermented with black yeast.

Examples of powdered food product include matcha, powdered green tea, powdered coffee, cocoa, powdered black tea, powdered cream, powdered herbs, powdered chocolate, powdered soup, powdered oolong tea, powdered Chinese tea, powdered vegetables, and powdered fruits. It should be noted that "powder" as referred to in the present invention includes granules. The powdered food product may contain these items either alone or in combination. For example, a mixed powder of powdered coffee and powdered cream or a mixed powder of powdered green tea and powdered cream may be used. Moreover, powdered coffee and powdered cream, or powdered green tea and powdered cream may be encapsulated separately and mixed when dissolved.

In this specification, a "paste-like substance" refers to a substance having viscosity, such as mayonnaise, ketchup, or egg yolk.

Hereinafter, the tabletop electric stirrer of the present invention will be described based on FIGS. 1 to 12. However, the present invention is not limited to the configuration in these drawings.

FIG. 1 is a diagram showing an embodiment of the tabletop electric stirrer of the present invention. FIG. 2(a) is a front view of the tabletop electric stirrer in FIG. 1, and FIG. 2(b) is a vertical cross-sectional view of the tabletop electric stirrer in FIG. 1.

A tabletop electric stirrer 1 includes a rotating body 10, an electric rotating means 20, and a casing 30. The rotating body 10 is connected to the electric rotating means 20 so that it can be rotated by the power of the electric rotating means 20. The casing 30 is fitted to the electric rotating means 20 so as to be able to house the rotating body 10 inside. Though fitted to the electric rotating means 20, the casing 30 may be fitted to an outer circumferential portion of the electric rotating means 20 so as not to rotate, rather than being rotatably fitted like the rotating body 10. It should be noted that although the casing 30 is fitted in FIGS. 1 and 2, the casing 30 is not necessarily required and may be fitted as necessary. Details of the casing 30 will be described later.

The electric rotating means 20 can be any means that can provide a rotary force for the rotating body 10 by means of electric power. An example of such a means is an electric motor. The electric motor may be of any type, such as a socket connection type (series type), a dry cell type, or a rechargeable (battery) type. The dry cell type and the rechargeable (battery) type are preferable in that such type can be used even in places where there is no socket, such as outdoors. Furthermore, the electric rotating means 20 may include a means for controlling the rotary force (the number of rotations) and the like.

There is no particular limitation to the size of the tabletop electric stirrer 1 of the present invention, and the stirrer can be of any size as long as it can be applied to various types of drinking vessels such as glasses, teacups, mugs, and coffee cups. For example, the overall length of the tabletop electric stirrer 1 of the present invention may be preferably about 15 cm to 30 cm and more preferably about 18 cm to 23 cm.

The rotating body 10 and the casing 30 are detachable from the electric rotating means 20. With such detachability, the rotating body 10 and the casing 30 can be easily cleaned and are thus hygienic. Hereinafter, the rotating body 10 and the casing 30 will be described.

Rotating Body

Figure 3:
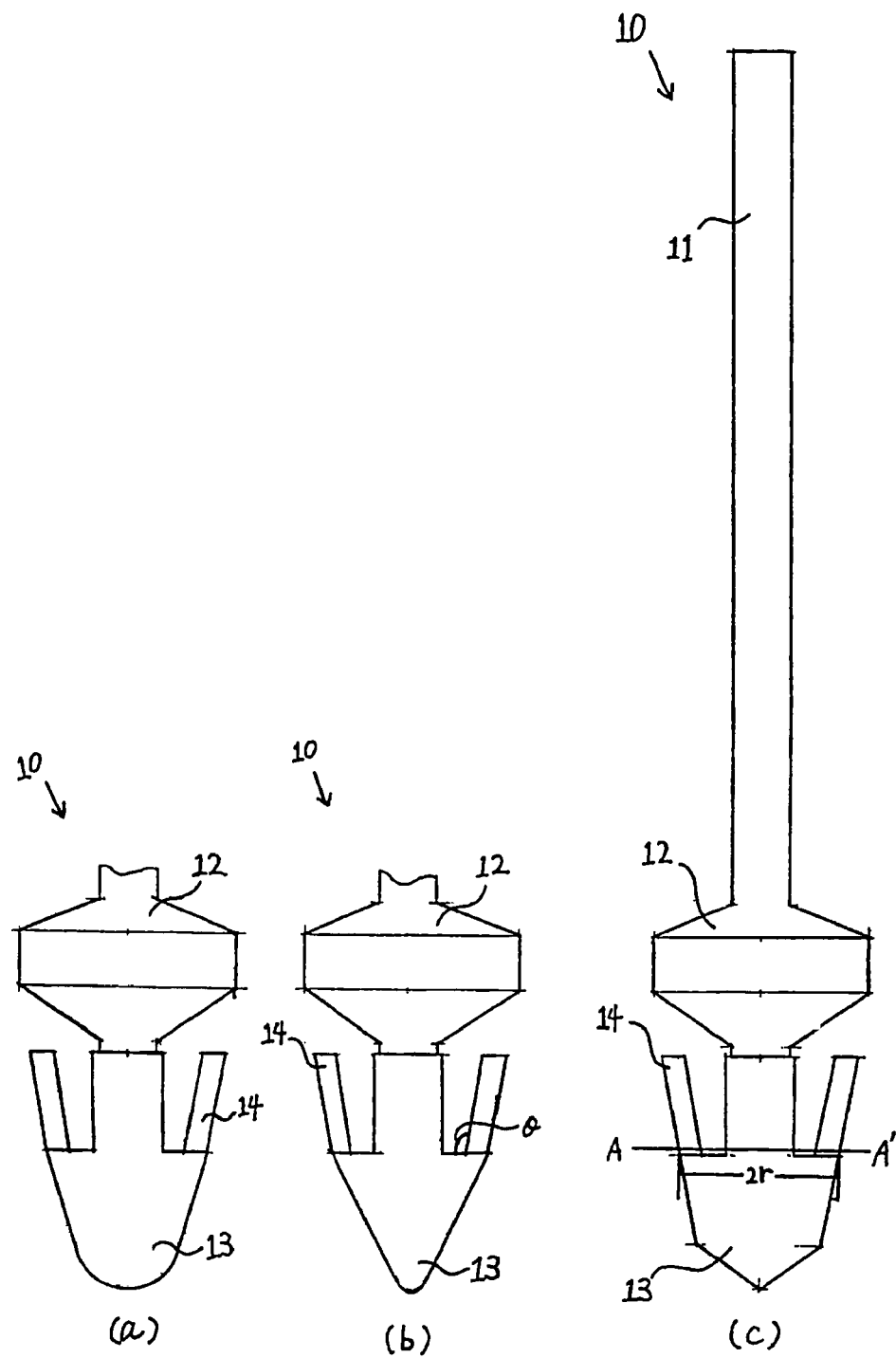
FIG. 3 shows front views of various embodiments of a rotating body for use in the tabletop electric stirrer of the present invention.

FIG. 3 is a front view showing an embodiment of a rotating body for use in the tabletop electric stirrer of the present invention.

The rotating body 10 comprises a stirring shaft 11, a rotating disk 12, and a stirring means 13 provided with a stirring blade 14. The stirring means 13 is provided at one end of the stirring shaft 11, and the rotating disk 12 is provided directly above the stirring blade 14 provided to the stirring means 13.

The tip of the stirring means 13 has a spherical shape or a conical shape. Specifically, the tip has a spherical shape as shown in FIG. 3(a) or a conical shape as shown in FIGS. 3(b) and (c). If the tip of the stirring means 13 has a conical shape, the tip may form an acute angle or an obtuse angle. Furthermore, if the tip of the stirring means 13 has a conical shape, the conical shape preferably has a rounded tip as shown in FIG. 3(b). The stirring means 13 having such a shape generates a pumping force and can thus prevent a phenomenon in which when the rotating body is rotated, a capsule is rotated in conjunction with the rotating body in a state in which the capsule is adsorbed to the stirring means.

The tip of the stirring means 13 is located on the center line of the stirring shaft 11. The tip being located in this manner allows the rotating body to rotate stably. Furthermore, the maximum diameter ($2r$ in FIG. 3(c)) of a cross-section of the stirring means 13 perpendicular to the stirring shaft 11 is greater than the diameter of the stirring shaft 11 and smaller than the diameter of the rotating disk 12. This maximum diameter may be preferably 10 mm to 20 mm and more preferably about 15 mm. The overall length of the stirring means 13 may be preferably 6 mm to 20 mm and more preferably about 10 mm to 15 mm.

It should be noted that the cross-section of the stirring shaft 11 may be circular or polygonal such as triangular or quadrangular and may have a maximum diameter of preferably 3 mm to 7 mm and more preferably about 5 mm. The maximum diameter of the rotating disk 12 may be preferably 15 mm to 23 mm and more preferably about 20 mm. It should be noted that the maximum diameter of the stirring shaft 11 may be different above and below the rotating disk 12.

Preferably, a pumping aid means 131 is formed on an outer circumferential face of the stirring means 13. FIG. 4(a) is a perspective view showing a state in which the stirring means 13 including the stirring blade 14 is provided with the pumping aid means 131, and FIG. 4(b) is a front view thereof.

The pumping aid means 131 is formed in at least one position on the outer circumferential face of the stirring means 13. The pumping aid means 131 formed on the stirring means 13 improves a pumping effect, and the improved pumping effect facilitates entanglement of the capsule with the stirring blade 14, which also improves the capsule crushing efficiency.

Figure 4:
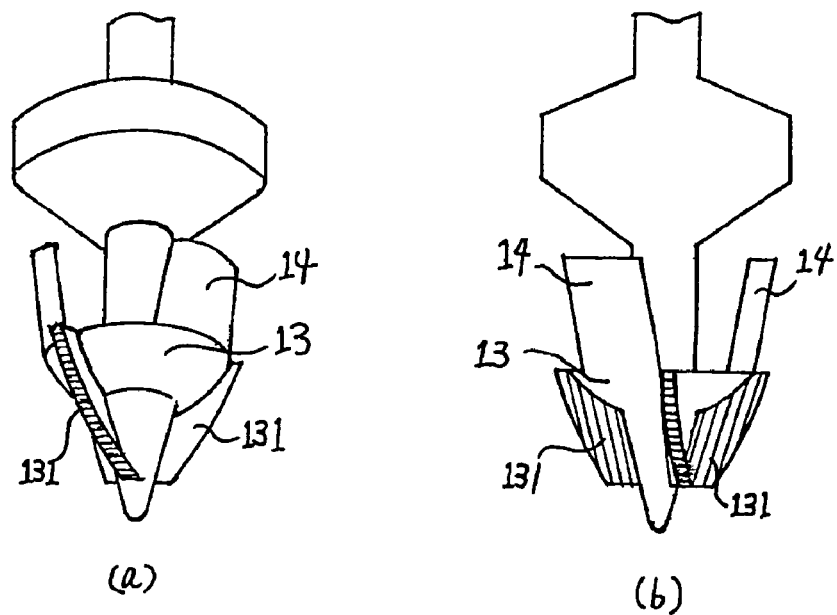
FIG. 4(a) is a perspective view showing a stirring means in which a pumping aid means is formed.
FIG. 4(b) is a front view showing a stirring means in which the pumping aid means is formed.

The pumping aid means 131 may have a plate-like shape as shown in FIG. 4 or it may be grooves directly formed on the outer circumferential face of the stirring means 13, and there is no particular limitation to its shape as long as the shape can cause water or the capsule to move upward.

The stirring means 13 is provided with the stirring blade 14. The stirring blade 14 is provided standing along the outer circumference with the maximum diameter of the stirring means 13 so as to face the stirring shaft 11, and a face of the stirring blade 14 facing the stirring shaft 11 (i.e., inner face) is a flat surface.

Figure 5:
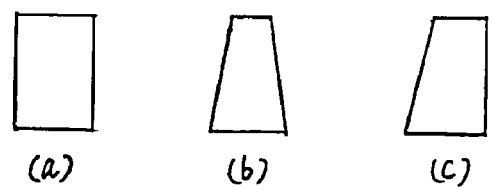
FIG. 5 shows front views of embodiments of a stirring blade.

FIG. 5 shows front views of embodiments of the stirring blade 14. As shown in FIG. 5, when viewed from the front, the stirring blade 14 may have such a shape as a vertically long rectangular shape (FIG. 5(a)) or a trapezoidal shape (FIGS. 5(b) and (c)). In view of the capsule crushing efficiency, the stirring efficiency, and the like, the shape of the stirring blade 14 is preferably a trapezoid having one inclined side as shown in FIG. 5(c).

If the stirring blade 14 has a rectangular shape as shown in FIG. 5(a), the length may be preferably 7 mm to 15 mm and more preferably about 10 mm, and the width may be preferably 3 mm to 8 mm and more preferably about 6 mm. If the stirring blade 14 has a trapezoidal shape as shown in FIGS. 5(b) and (c), the length in a vertical direction may be the same as that in the case of a rectangular shape, and with respect to a horizontal direction, the length of the long side may be preferably 3 mm to 8 mm and more preferably about 6 mm.

Figure 6:
FIG. 6 shows top views of embodiments of a stirring blade.

FIG. 6 shows top views of embodiments of the stirring blade 14. As shown in FIG. 6, one face of the stirring blade 14 (i.e., a face facing the stirring shaft 11) is a flat surface. The other face is not necessarily a flat surface as shown in FIG. 6(e) and may be of other shapes, such as a circular arc shape, as shown in FIGS. 6(a) to (d). Among these shapes, a shape having an acute angle at one end as shown in FIG. 6(b) is preferable in view of the capsule crushing efficiency. In the case of the shape shown in FIG. 6(b), the stirring blade 14 itself also has a function of a cutting edge.

At least two stirring blades 14 are provided along the outer circumference with the maximum diameter of the stirring means 13 so as to face the stirring shaft 11. Preferably, three stirring blades 14 are provided. Each of a plurality of stirring blades 14 preferably has the same shape.

Each stirring blade 14 is provided in such a manner that an angle formed by the flat surface of the stirring blade 14 and the maximum-diameter cross section of the stirring means 13 on the stirring shaft 11 side (i.e., θ in FIG. 3(b)) is 95° to 135°, preferably 95° to 110°, and more preferably about 100°. In other words, the stirring blade 14 is not provided parallel to the stirring shaft 11, but is rather provided in such a manner that the distance between the stirring shaft 11 and the stirring blade 14 increases from the tip side of the stirring means 13 toward the rotating disk 12 side.

Figure 7:
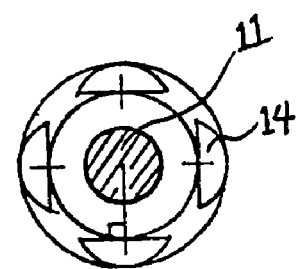
FIG. 7 is a cross-sectional view taken along line A-A' in FIG. 3(a).

The stirring blades 14 are provided in such a manner that central portions of the flat surfaces of the stirring blades 14 in a width direction are located on a circumference of a single circle around the stirring shaft 11 serving as a center. FIG. 7 is a cross-sectional view taken along line A-A' in FIG. 3(a). The positional relationship between the stirring blades 14 and the stirring shaft 11 will be described based on FIG. 7.

FIG. 7 shows an embodiment of the case where four stirring blades 14 are provided, and center points of the flat surfaces of the respective stirring blades 14 in a width direction are located on a circumference of a single circle around the stirring shaft 11 serving as a center. That is to say, the stirring blades 14 are located on the stirring means 13 in such a manner that straight lines connecting the center of the stirring shaft 11 and the center points of the flat surfaces of the stirring blades 14 in a width direction are perpendicular lines.

Thus, the stirring blades 14 define a specific angle with the cross-section of the stirring means 13 and are configured so as to have a specific relationship with the stirring shaft 11, thereby preventing the occurrence of a V-shaped vortex due to centrifugal forces and generating an upward water flow along the stirring shaft 11.

Figure 8:
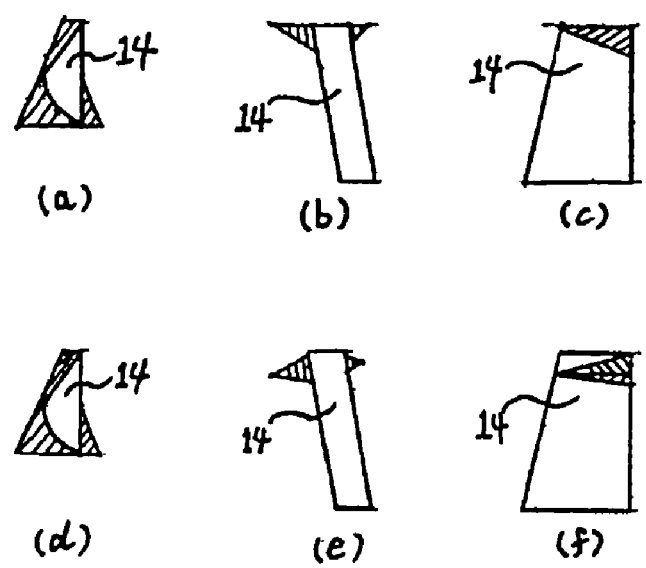
FIGS. 8(a) to (c) show an embodiment of a stirring blade having a cutting edge, where
FIGS. 8(d) to (f) show another embodiment of a stirring blade having a cutting edge, where

Furthermore, the stirring blade 14 preferably has a cutting edge. FIG. 8 shows embodiments of the stirring blade 14 having a cutting edge. FIGS. 8(a) to (c) show an embodiment where FIG. 8(a) is a top view, FIG. 8(b) is a side view, and FIG. 8(c) is a front view. Moreover, FIGS. 8(d) to (f) show another embodiment where FIG. 8(d) is a top view, FIG. 8(e) is a side view, and FIG. 8(f) is a front view. The hatched areas represent the cutting edge. There is no particular limitation to the shape of the cutting edge. The stirring blade 14 can be provided with at least one cutting edge. As shown in the side views of FIGS. 8(b) and (e), preferably two cutting edges are provided on the inside (the stirring shaft 11 side) and the outside (the opposite side of the stirring shaft 11) of the stirring blade 14. The cutting edges provided on the inside and the outside of the stirring blade 14 may be arranged not only in corresponding positions but also in different positions.

The rotating disk 12 is provided in order to stop the upward water flow colliding with it and to provide a means that can improve a crushing effect, a stirring effect, and a foaming effect. There is no particular limitation to the rotating disk 12 as long as it has a shape that can stop water flow by collision and allow smooth circulation, and a shape like a bead of an abacus as shown in FIG. 3 is preferable. The maximum diameter of the rotating disk 12 is as described above.

Figure 9:
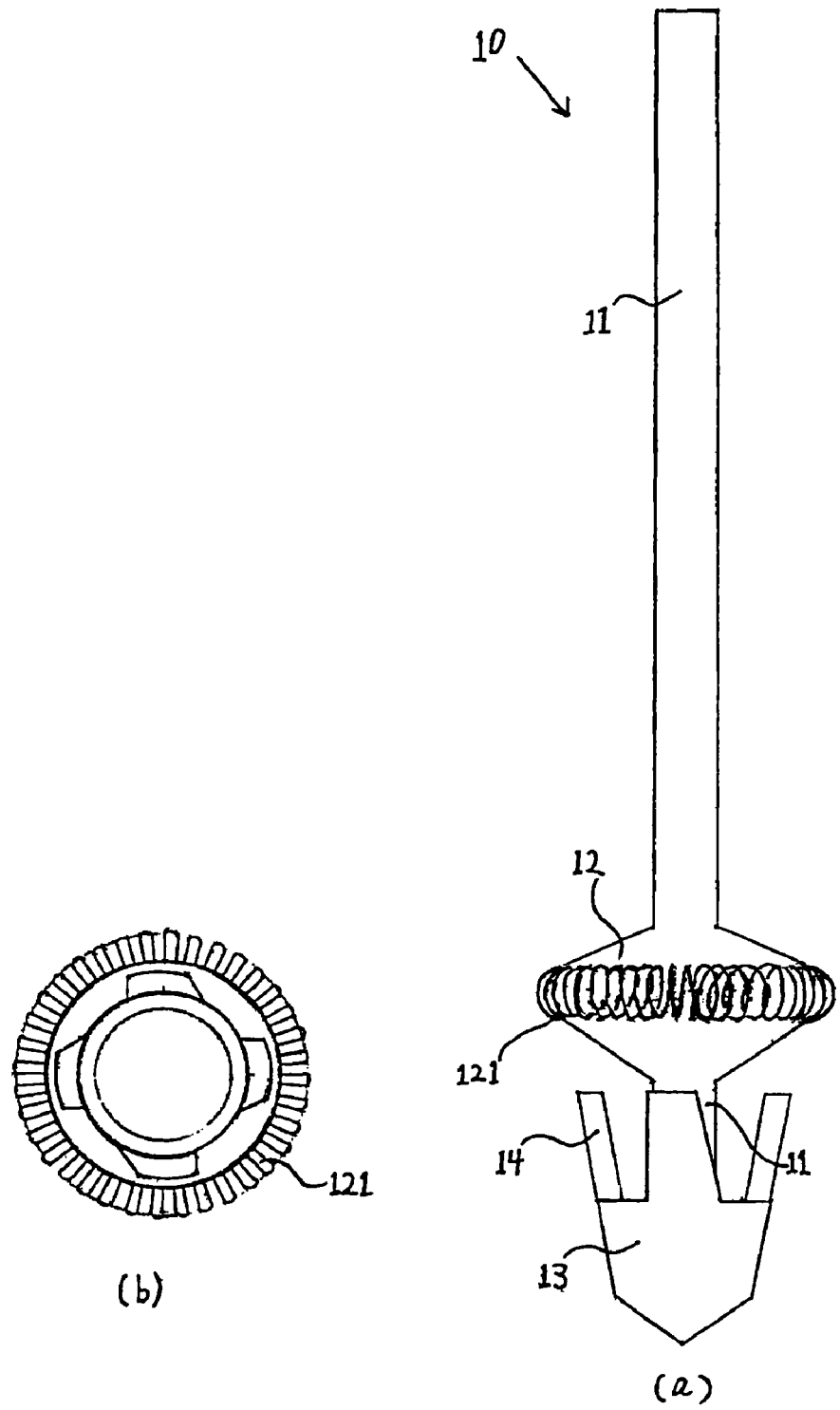
FIG. 9 is a diagram showing another embodiment of a rotating body for use in the tabletop electric stirrer of the present invention.

FIG. 9 is a diagram showing another embodiment of the rotating body for use in the tabletop electric stirrer of the present invention. In this embodiment, a coil 121 is attached to the rotating disk 12. The attachment of the coil 121 improves the crushing effect, the stirring effect, and the foaming effect.

There is no limitation to the material for the coil 121 as long as it can be formed into a spiral shape, and either of a metal and a resin may be used.

Figure 10:
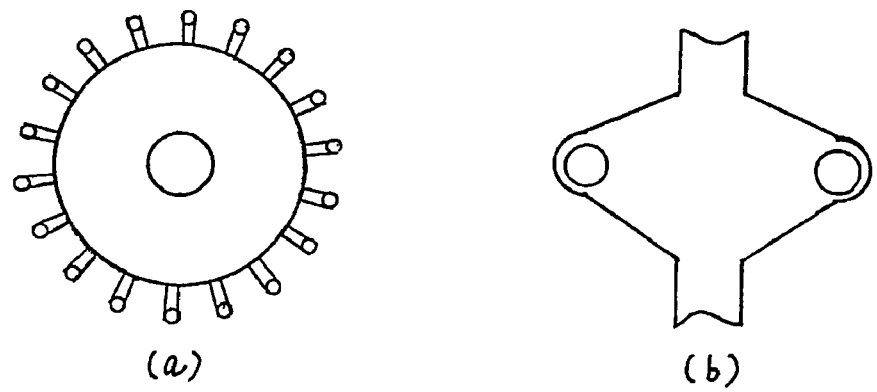
FIG. 10 is a diagram showing another embodiment of a rotating disk.
Figure 11:
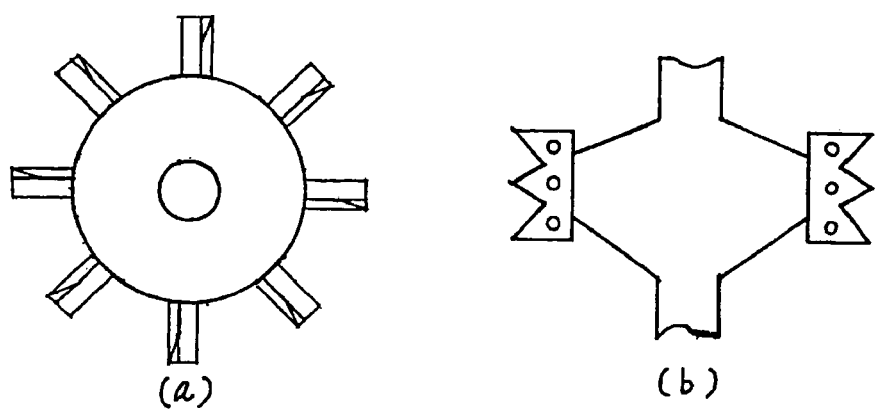
FIG. 11 is a diagram showing still another embodiment of a rotating disk.

Furthermore, as shown in FIGS. 10 and 11, processing that can improve the crushing effect, the stirring effect, and the foaming effect may be applied to the rotating disk 12 itself.

FIG. 10(a) is a transverse cross-sectional view of the rotating disk 12 whose outer circumferential face has been processed into a coil shape, and FIG. 10(b) is a vertical cross-sectional view thereof. With such a rotating disk 12, the crushing effect, the stirring effect, and the foaming effect can be improved without attaching the coil 121.

FIG. 11(a) is a transverse cross-sectional view of the rotating disk 12 whose outer circumferential face is provided with blades having cutting edges, and FIG. 11(b) is a vertical cross-sectional view thereof. With such a rotating disk 12, not only the foaming effect but also the capsule crushing effect can be improved.

The rotating body 10 may be produced by separate formation of the stirring shaft 11, the rotating disk 12, the stirring means 13, and the stirring blades 14 and adhesion of them together, or may be formed integrally using a mold or the like. Furthermore, there is no particular limitation to the materials for the stirring shaft 11, the rotating disk 12, the stirring means 13, and the stirring blade 14, and, for example, a resin or a metal can be used.

Casing

The tabletop electric stirrer of the present invention may be fitted with the casing 30 as necessary. The casing 30 restricts the range within which a capsule in a vessel can float and improves the capsule crushing efficiency, the stirring efficiency, and the like. The casing 30 has an outlet 31, an opening 32, and a liquid inlet 34 and may include a splash prevention cover 33 as necessary.

Figure 12:
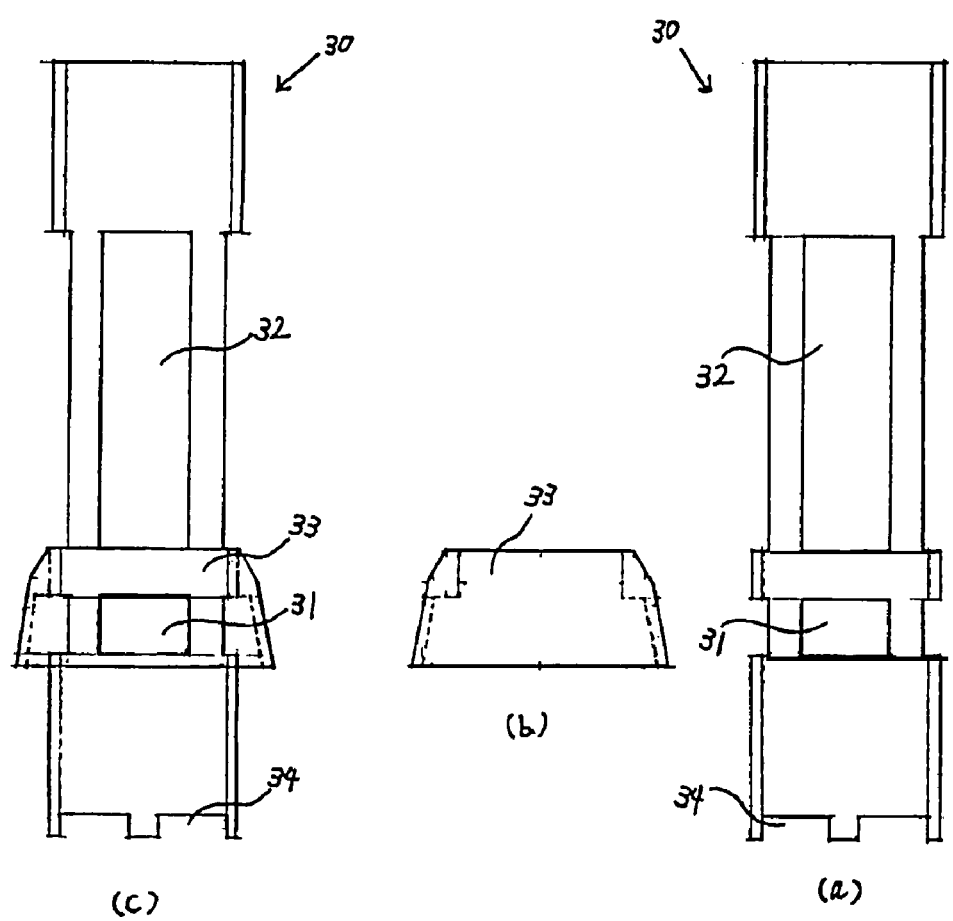
FIG. 12 shows front views of a casing for use in the tabletop electric stirrer of the present invention.

FIG. 12 shows front views of the casing 30 for use in the tabletop electric stirrer of the present invention, where FIG. 12(a) is a front view when the splash prevention cover 33 is not fitted, FIG. 12(b) is a front view of the splash prevention cover 33, and FIG. 12(c) is a front view when the splash prevention cover 33 is fitted.

The casing 30 is a tube, but there is no limitation to the shape thereof as long as the rotating body 10 can be housed, and the cross-sectional shape of the tube can be circular or polygonal such as quadrangular, hexagonal, or octagonal. The outer shape and the inner shape of the cross-section may be different from each other, that is, for example, the outer shape may be polygonal and the inner shape may be circular. In view of the ease of processing, it is preferable that both of the outer shape and the inner shape of the cross-section are circular.

One end of the casing 30 is provided with at least one liquid inlet 34 formed in a side face of the casing 30, and the other end is configured so that it can be fitted to the electric rotating means 20.

There is no particular limitation to the overall length of the casing 30, and the overall length may be preferably about 10 cm to 20 cm and more preferably about 13 cm to 17 cm. Moreover, there is no particular limitation to the inner diameter of the casing 30 as long as its width allows the rotating body 10 to be housed, and the inner diameter may be preferably 25 mm to 35 mm and more preferably about 28 mm.

Figure 2:
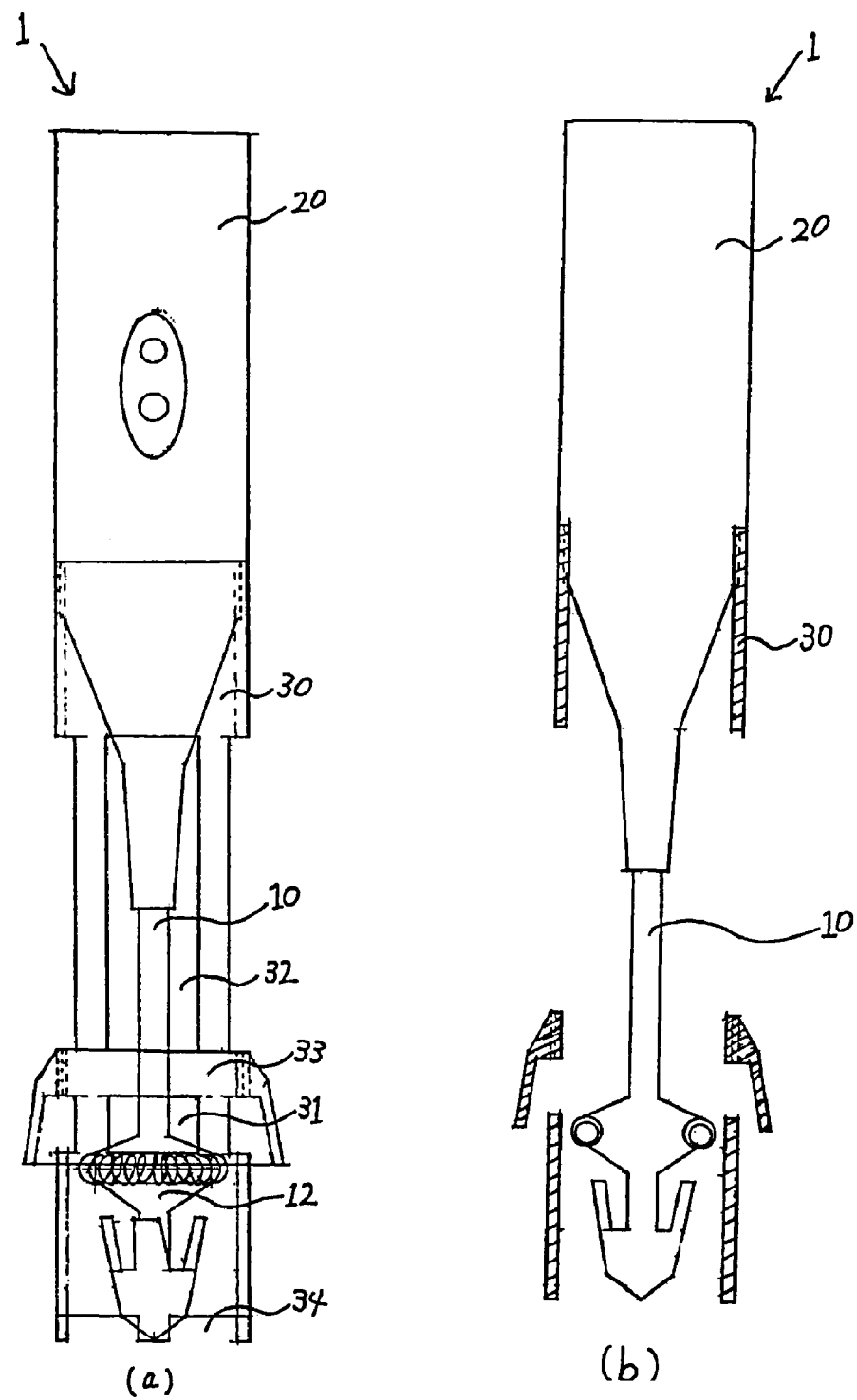
FIG. 2(a) is a front view of the tabletop electric stirrer in FIG. 1.
FIG. 2(b) is a vertical cross-sectional view of the tabletop electric stirrer in FIG. 1.

At least one outlet 31 and at least one opening 32 are formed in the side face of the casing 30. As shown in FIG. 2, the casing 30 is fitted so that a lower end of the outlet 31 is positioned in the vicinity of or several millimeters above the maximum diameter (a central portion) of the rotating disk 12. Due to the casing 30 fitted in this manner, upflow and downflow circulation can be made effective, and even when stirring is performed at a high rotational speed in a bottom portion of the vessel, relatively moderate rotation can be maintained on the surface of a liquid in an upper portion of the vessel (i.e., the liquid in the vessel does not splash).

The outlet 31 discharges an upward water flow generated by the stirring means 13 including the stirring blades 14 from the inside to the outside of the casing 30 to circulate water flow. Furthermore, when the outlet 31 is located so as to correspond to the surface of the liquid in the vessel, foaming is rapidly accelerated by the air over the liquid surface and the upward water flow.

The outlet 31 is formed in a position that corresponds to the rotating disk 12 of the rotating body 10 when the rotating body 10 is housed in the casing 30. Preferably, the outlet 31 is formed so that the lower end (a side opposite to a portion to which the electric rotation means 20 is fitted) of the outlet 31 is located about 2 mm to 5 mm above the central portion of the rotating disk 12. The height of the outlet 31 may be preferably 5 mm to 15 mm and more preferably about 10 mm. The width of the outlet 31 may be preferably 10 mm to 20 mm and more preferably about 15 mm.

The opening 32 aspirates the liquid outside the casing 30 into the casing 30 to circulate water flow. Furthermore, the opening 32 also aspirates the air over the liquid surface along with the liquid and thus improves the foaming effect.

The opening 32 is formed between the outlet 31 and the portion to which the electric rotating means 20 is fitted. The length of the opening 32 may be preferably 40 mm to 70 mm and more preferably 50 mm to 60 mm, depending on the overall length of the casing 30. The width of the opening 32 may be preferably 7 mm to 20 mm and more preferably about 15 mm.

Preferably, the outlet 31 and the opening 32 are close to each other. For example, the distance between the outlet 31 and the opening 32 may be about 5 mm to 10 mm.

Furthermore, the casing 30 may be fitted with the splash prevention cover 33 as necessary. The splash prevention cover 33 is fitted so as to cover the outlet 31 to prevent splashing of the liquid from the outlet 31 and also to guide the discharged water flow in a downward direction (a direction toward the liquid inlet 34). The splash prevention cover 33 can be set as appropriate in accordance with the size of the casing 30.

There is no particular limitation to the material for the casing 30, and, for example, a resin or a metal can be used.

Example 1

Capsule Dissolution Time

A single, unfilled, water-soluble capsule derived from plant material (having a major diameter of 24 mm, manufactured by Capsugel Japan Inc.) was sunk to the bottom of a vessel containing cold water (at a water temperature of 22° C.) and held down with the tip of the tabletop electric stirrer of the present invention shown in FIG. 1. Then, stirring was started, and the time it took for the capsule to be crushed and fragments of the capsule to dissolve and disappear was measured. The measurement was performed ten times. From the ten measurement results, the maximum and minimum times were excluded, and an average time of the other eight measurement results was obtained.

The average time it took for the capsule to dissolve was 38.87 seconds.

Example 2

The measurement was performed according to the same procedure as Example 1 except that hot water (at a water temperature of 72° C.) was used instead of cold water (at a water temperature of 22° C.) used in Example 1, and the average time was obtained.

The average time it took for the capsule to dissolve was 13.12 seconds.

Example 3

The measurement was performed according to the same procedure as Example 1 except that stirring was performed using a stirrer provided with stirring blades 14 having a cutting edge (FIG. 8(*a*)), instead of the stirrer used in Example 1, and the average time was obtained.

The average time it took for the capsule to dissolve was 29.75 seconds.

Example 4

The measurement was performed according to the same procedure as Example 3 except that hot water (at a water temperature of 72° C.) was used instead of cold water (at a water temperature of 22° C.) used in Example 3, and the average time was obtained.

The average time it took for the capsule to dissolve was 8.87 seconds.

Comparative Example 1

The measurement was performed according to the same procedure as Example 1 except that stirring was performed manually using a spoon instead of the stirrer used in Example 1, and the average time was obtained. It should be noted that the stirring was performed by turning the spoon at a rate of 3 to 4 rotations per second.

The average time it took for the capsule to dissolve was 111.75 seconds.

Comparative Example 2

The measurement was performed according to the same procedure as Comparative Example 1 except that hot water (at a water temperature of 72° C.) was used instead of cold water (at a water temperature of 22° C.) used in Comparative Example 1, and the average time was obtained.

The average time it took for the capsule to dissolve was 49 seconds.

Example 5

Sedimentation Test

First, 2.5 mL of green tea powder and 150 mL of hot water at 60° C. were put in a vessel and then stirred for one minute with the stirrer used in Example 1. The vessel was allowed to stand, and in the state of a solution sixty minutes after the stirring, the amount of sedimenting green tea powder was measured. A supernatant portion of the hot water was discarded until the sediment almost flew out of the vessel, and the amount of the solution including the sediment remaining in the vessel was measured as the amount of sedimentation. This test was repeated three times, and an average amount of sedimentation was obtained from the three test results and found to be 6.9 mL.

Comparative Example 3

The test and measurement was performed according to the same procedure as Example 5 except that stirring was performed manually using a spoon instead of the stirrer used in Example 5. It should be noted that the stirring was performed by turning the spoon at a rate of 2 to 3 rotations per second. The amount of sedimenting green tea powder sixty minutes after the stirring was found to be 8.8 mL (the average of the three test results).

INDUSTRIAL APPLICABILITY

According to the present invention, the stirrer has a size and a structure that can be adapted to various types of drinking vessels, can perform stirring efficiently, can easily crush and dissolve a water-soluble capsule not only in hot water but also in cold water, and furthermore, can crush and dissolve even a plurality of capsules in a short period of time. Furthermore, since a paste-like substance such as mayonnaise or ketchup can be dissolved in a liquid in a short period of time, an oily ingredient such as oil and an aqueous ingredient such as vinegar can be uniformly stirred together. Therefore, dressing sauces can be made conveniently. Thus, the tabletop electric stirrer of the present invention is useful in the field of food products and beverages.

The invention claimed is:

1. A tabletop electric stirrer comprising a rotating body and an electric rotating means,
    wherein the rotating body comprises a stirring shaft, a rotating disk, and a stirring means provided with stirring blades, the stirring means being provided at one end of the stirring shaft, the rotating disk being provided directly above the stirring blades provided to the stirring means, and the other end of the stirring shaft being configured so as to be connected to the electric rotating means,
    wherein the stirring means has a spherical or conical tip, the tip being located on a center line of the stirring shaft, and a maximum diameter of a cross-section of the stirring means perpendicular to the stirring shaft is greater than a diameter of the stirring shaft and smaller than a diameter of the rotating disk,
    wherein the stirring blades are provided in such a manner that at least two stirring blades are located along an outer circumference with the maximum diameter of the stirring means so as to face the stirring shaft, and a face of the stirring blades facing the stirring shaft is a flat surface, and
    wherein the stirring blades are provided in such a manner that an angle formed by the flat surface and the cross-section with the maximum diameter of the stirring means on the stirring shaft side is 95° to 135° and central portions of the flat surfaces of the respective stirring blades in a width direction are located on a circumference of a single circle around the stirring shaft serving as a center.

2. The tabletop electric stirrer of claim 1, further comprising a casing,
    wherein the casing is a tube and is fitted to the electric rotating means so as to be able to house the rotating body,
    wherein at least one outlet and at least one opening are formed in a side face of the casing,
    wherein the outlet is formed in a position that corresponds to the rotating disk when the rotating body is housed, and
    wherein the opening is formed between the outlet and a portion to which the electric rotating means is fitted.

* * * * *